(12) United States Patent
Hosokawa et al.

(10) Patent No.: US 10,514,522 B2
(45) Date of Patent: Dec. 24, 2019

(54) LENS DRIVE UNIT

(71) Applicant: TDK CORPORATION, Tokyo (JP)

(72) Inventors: Masahiro Hosokawa, Tokyo (JP);
Naoki Yusa, Tokyo (JP); Seiji Fukuoka, Tokyo (JP); Mio Hamashima, Tokyo (JP); Toshiki Maruyama, Tokyo (JP); Hiroshi Tojo, Tokyo (JP); Mitsunao Homma, Tokyo (JP); Takuto Horii, Tokyo (JP); Atsushi Ezawa, Tokyo (JP); Tatsuya Taki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 188 days.

(21) Appl. No.: 15/640,671

(22) Filed: Jul. 3, 2017

(65) Prior Publication Data

US 2018/0011281 A1    Jan. 11, 2018

(30) Foreign Application Priority Data

Jul. 5, 2016   (JP) ................................. 2016-133640

(51) Int. Cl.
*G02B 7/02*    (2006.01)
*H02N 2/04*    (2006.01)

(52) U.S. Cl.
CPC ............... *G02B 7/023* (2013.01); *H02N 2/04* (2013.01)

(58) Field of Classification Search
CPC ...... G02B 7/08; G02B 7/102; H02K 41/0356; G11B 7/0932; G11B 7/0935
See application file for complete search history.

(56) References Cited

U.S. PATENT DOCUMENTS

2006/0164538 A1* 7/2006 Kawasaki ............. G02B 7/102
                                                             348/335
2008/0258579 A1* 10/2008 Yamada .................. G02B 7/08
                                                             310/328

FOREIGN PATENT DOCUMENTS

CN          1811513 A      8/2006
JP       2015-89183 A      5/2015

* cited by examiner

*Primary Examiner* — Alicia M Harrington
(74) *Attorney, Agent, or Firm* — Oliff PLC (57) ABSTRACT

A lens drive unit that prevents an actuator from being inclined is provided. In the lens drive unit, when a lens frame is displaced in a direction orthogonal to a direction in which the actuator extends and contracts with respect to a base member by, for example, impact from an outside of the lens drive unit, a drive shaft of the actuator abuts on a first lateral wall and a column, so that the actuator is prevented from being inclined with respect to the base member.

9 Claims, 7 Drawing Sheets

LENS DRIVE UNIT

CROSS-REFERENCE TO RELATED APPLICATIONS

This application is based upon and claims the benefit of priority from Japanese Patent Application No. 2016-133640, filed on 5 Jul. 2016, the entire content of which is incorporated herein by reference.

TECHNICAL FIELD

This disclosure relates to a lens drive unit.

BACKGROUND

A known lens drive unit for an imaging device mounted in a cellular phone incorporates a smooth impact drive mechanism (SIDM: a registered trademark).

Japanese Unexamined Patent Publication No. 2015-089183, for example, discloses a lens drive unit that incorporates the smooth impact drive mechanism. This lens drive unit comprises an actuator having one end fixed to a base member, a drive shaft joined with the other end of the actuator, and a friction engagement unit frictionally engaging an outer periphery of the drive shaft. In the lens drive unit described above, extension and contraction of the actuator is imparted to the drive shaft and the friction engagement unit frictionally engaging the drive shaft with a predetermined friction force is driven by making use of a difference in speed between when the actuator extends and when the actuator contracts.

The friction engagement unit includes a lens frame fitted with a lens having an optical axis extending in parallel with a direction of extension and contraction of the actuator. Causing the friction engagement unit to advance and retract in the direction of extension and contraction of the actuator results in the lens frame advancing and retracting.

In the lens drive unit described above, the lens frame of the friction engagement unit is displaced with respect to the base member in a direction orthogonal to the direction in which the friction engagement unit advances and retracts to press the drive shaft by impact from an outside of the lens drive unit or the like. In this case, the piezoelectric actuator is inclined with respect to the base member.

The present disclosure provides a lens drive unit that prevents an inclination of the actuator.

SUMMARY

A lens drive unit according to one aspect of the present disclosure includes: an actuator, including a piezoelectric element, configured to be capable of extending and contracting in one direction; a base member configured to fix the actuator on one end in a direction of extension and contraction of the actuator; a friction engagement member having one end frictionally engaging an outer periphery of the other end of the actuator in the direction of extension and contraction of the actuator; a lens frame coupled to the friction engagement member; and an inclination restrictor disposed at a position opposite to a contact position between the other end of the actuator and the one end of the friction engagement member with respect to an axis of the actuator, having predetermined intervals from the other end of the actuator as viewed from the direction of extension and contraction of the actuator.

In the lens drive unit, when a difference in speed is produced between when the actuator extends and when the actuator contracts during the extension and contraction of the actuator, the friction engagement member that is frictionally engaged with the outer periphery of the actuator on the other end is driven in the direction of extension and contraction of the actuator. As the friction engagement member is driven, the lens frame coupled to the friction engagement member is also driven in the direction of extension and contraction of the actuator.

When the lens frame is displaced in a direction orthogonal to the direction of extension and contraction of the actuator with respect to the base member by, for example, impact from an outside of the lens drive unit, the other end of the actuator abuts on the inclination restrictor, so that the actuator is prevented from being inclined with respect to the base member.

In the lens drive unit according to another aspect of the present disclosure, the friction engagement member includes, on a side of the one end of the friction engagement member, a slider portion held by the lens frame and a spring portion biased toward the slider portion, and the slider portion and the spring portion clamp therebetween the other end of the actuator to frictionally engage the other end of the actuator.

In the lens drive unit according to another aspect of the present disclosure, the other end of the actuator contacts the slider portion of the friction engagement member at a first contact position and a second contact position, and the inclination restrictor includes a first inclination restrictor disposed at a position opposite to the first contact position with respect to the axis of the actuator and a second inclination restrictor disposed at a position opposite to the second contact position with respect to the axis of the actuator.

In the lens drive unit according to another aspect of the present disclosure, the first inclination restrictor is disposed in a region surrounded by the slider portion of the friction engagement member, the spring portion of the friction engagement member, and the actuator.

In the lens drive unit according to another aspect of the present disclosure, the first inclination restrictor has a first opposed surface facing an outer peripheral surface of the other end of the actuator, the first opposed surface having a shape that follows along the outer peripheral surface.

In the lens drive unit according to another aspect of the present disclosure, the first inclination restrictor has a second opposed surface facing the friction engagement member, the second opposed surface having a shape that follows along a shape of the friction engagement member.

In the lens drive unit according to another aspect of the present disclosure, the first inclination restrictor is spaced a predetermined distance away from the friction engagement member.

In the lens drive unit according to another aspect of the present disclosure, the first inclination restrictor and the second inclination restrictor are formed of a material identical to a material forming the base member.

In the lens drive unit according to another aspect of the present disclosure, the first inclination restrictor and the second inclination restrictor are integrally molded with the base member.

In the lens drive unit according to another aspect of the present disclosure, the friction engagement member has the one end extending in a direction orthogonal to the direction of extension and contraction of the actuator and frictionally engaging an outer periphery of the other end of the actuator, the friction engagement member has the other end coupled to the lens frame such that a lens is to be mounted so as to have a lens optical axis oriented in a direction extending in parallel with the direction of extension and contraction of the actuator.

DETAILED DESCRIPTION

An embodiment of the present disclosure will be described in detail below with reference to the accompanying drawings. In the description that follows, like elements or elements having like functions are identified by like reference numerals and descriptions for those elements will be omitted.

Figure 1:
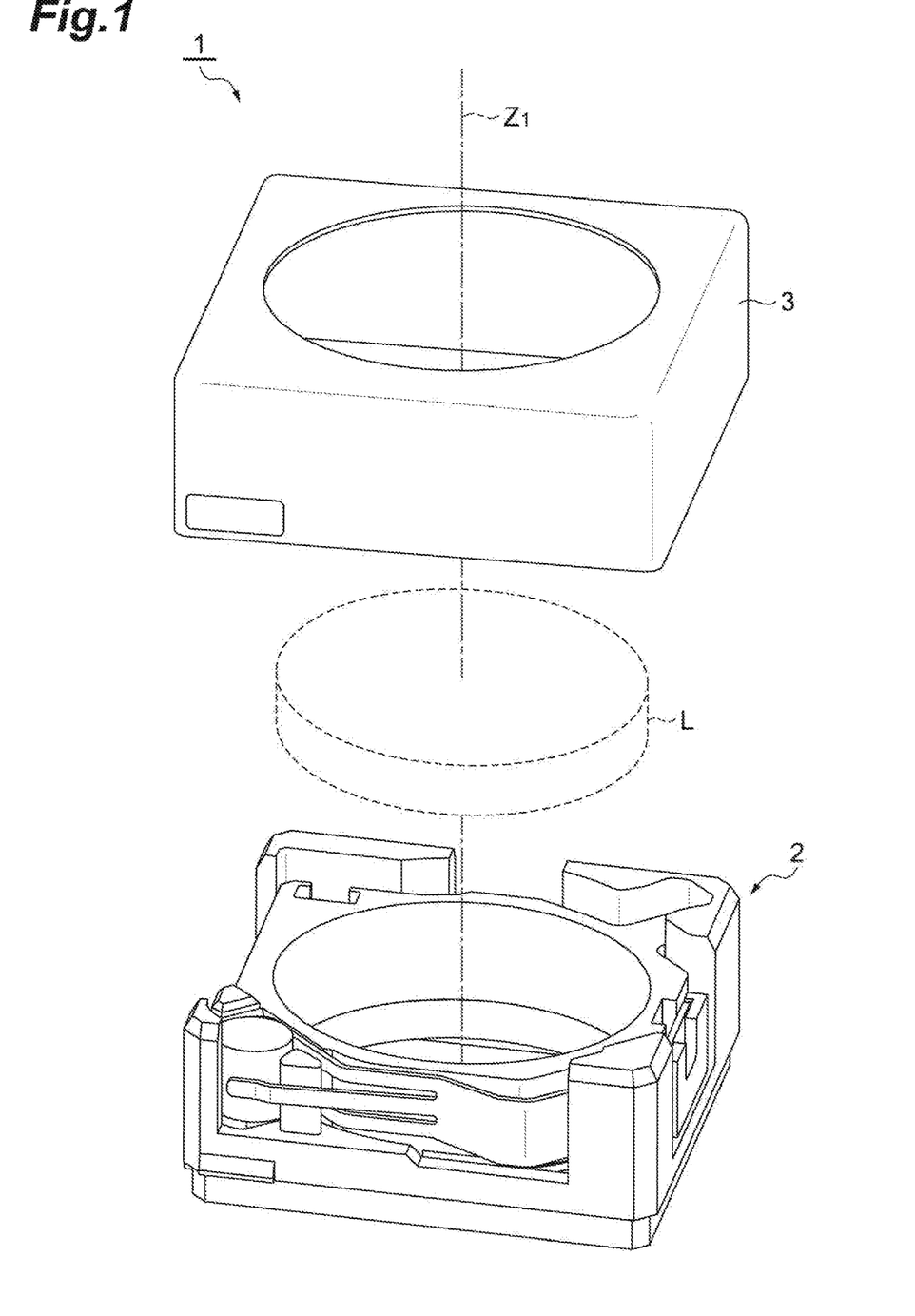
FIG. 1 is an exploded perspective view illustrating a lens drive unit according to one embodiment.

As illustrated in FIG. 1, a lens drive unit 1 includes a lens drive section 2 and a cover 3 that covers the lens drive section 2. The lens drive unit 1 has a lens optical axis Z1 that serves as an optical axis of a lens L to be mounted in the lens drive unit 1.

Figure 2:
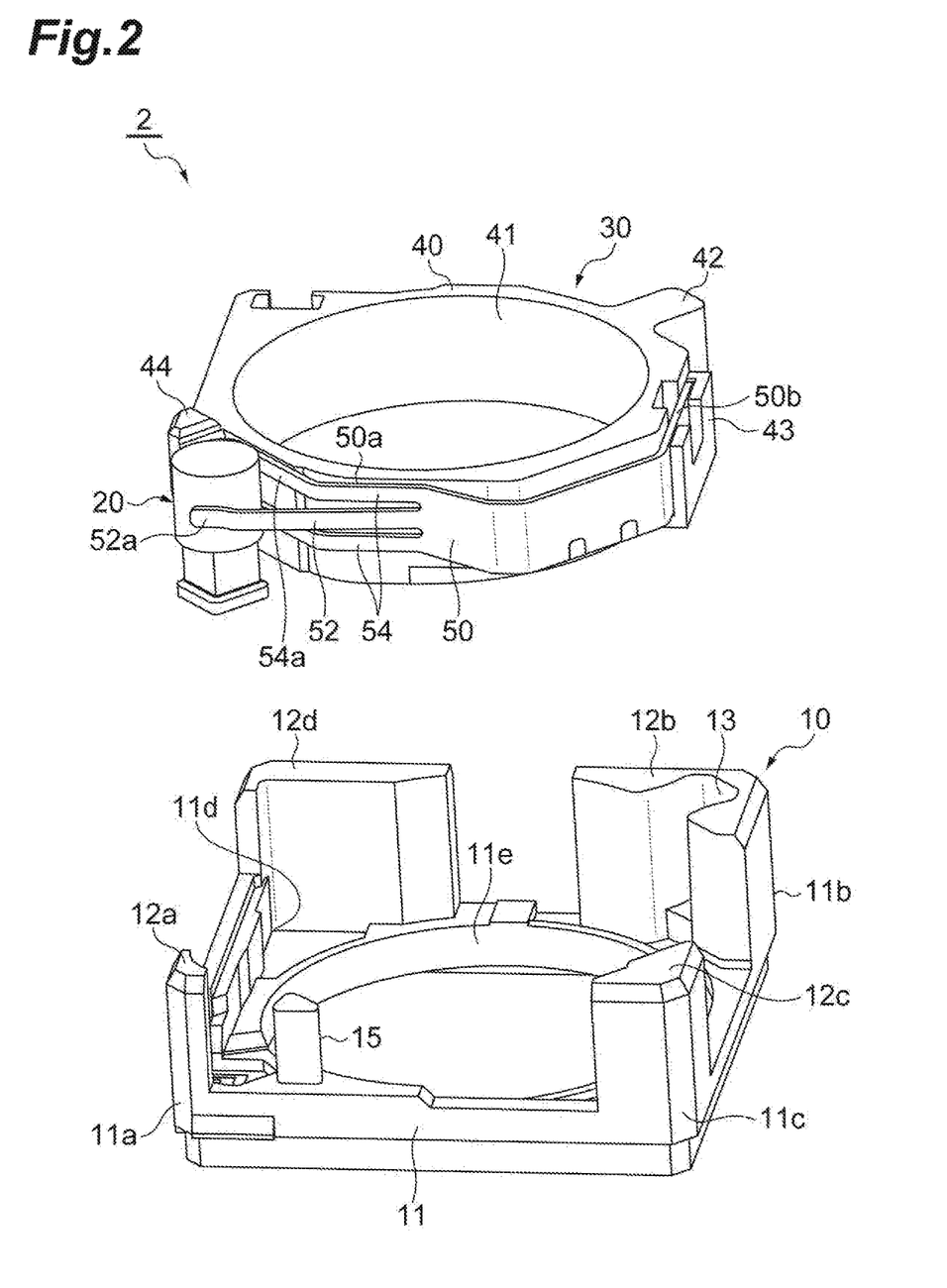
FIG. 2 is an exploded perspective view illustrating a lens drive section illustrated in FIG. 1.

As illustrated in FIG. 2, the lens drive section 2 includes a base member 10, an actuator 20, and a friction engagement unit 30.

The base member 10 includes a bottom 11, a first lateral wall 12a, a second lateral wall 12b, a third lateral wall 12c, and a fourth lateral wall 12d. The bottom 11 has a rectangular shape in a plan view. The bottom 11 has an opening 11e formed in a central portion thereof. The opening 11e has a completely circular shape in a plan view. The base member 10 is formed of a resin material (e.g., a liquid crystal polymer) including a filler that is formed, for example, of glass or an inorganic material. The base member 10 may be molded by, for example, injection molding.

The bottom 11 of the base member 10 includes a first corner 11a, a second corner 11b, a third corner 11c, and a fourth corner 11d. The first corner 11a and the second corner 11b are disposed at mutually diagonal positions. The third corner 11c and the fourth corner 11d are disposed at mutually diagonal positions.

The first to fourth lateral walls 12a to 12d are erected in a standing condition from the first to fourth corners 11a to 11d of the bottom 11, respectively. The first to fourth lateral walls 12a to 12d are each formed of a material identical to a material that is used to form the bottom 11 and are each formed integrally with the bottom 11.

The second lateral wall 12b has a cutout 13 formed in an inside thereof at a position corresponding to a first protrusion 42 of a lens frame 40 to be described later.

Figure 3:
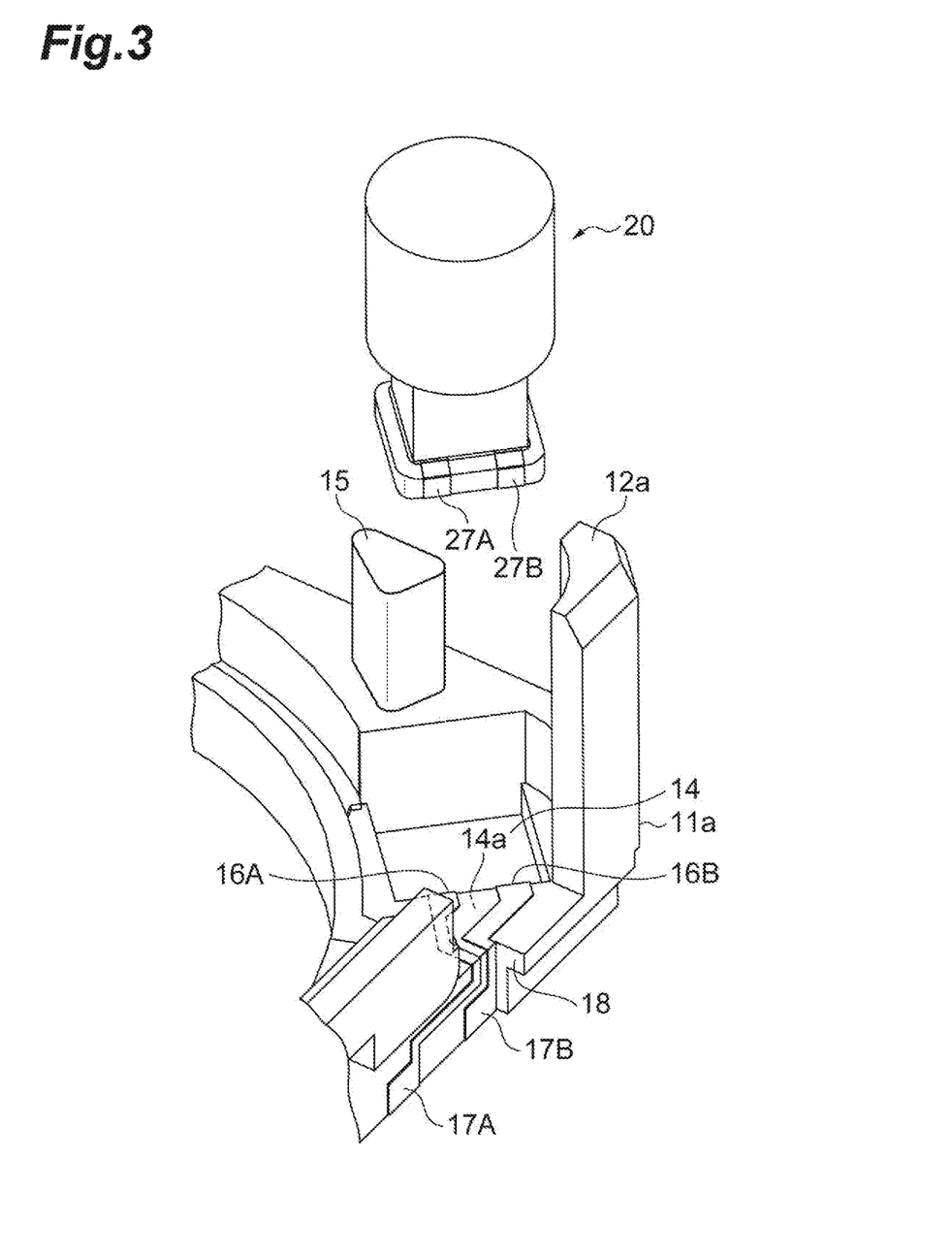
FIG. 3 is a view illustrating a mode in which an actuator is mounted in a base member.

As illustrated in FIG. 3, an actuator holding portion 14 is disposed inside the first lateral wall 12a at the first corner 11a. The actuator holding portion 14 houses an end of the actuator 20 on the side adjacent to the base member 10. The actuator holding portion 14 is a recess having a rectangular shape in a plan view.

A column 15 is erected in a standing condition from the base member 10 at a position near and inside the first lateral wall 12a at the first corner 11a. The column 15 is disposed at a position between a spring portion 52 and a shaft receiver 54 of a friction engagement member 50 to be described later. The column 15 is formed of a material identical to a material that is used to form the base member 10 and is formed integrally with the base member 10.

A configuration of the actuator 20 will be described below with reference to FIG. 4.

Figure 4:
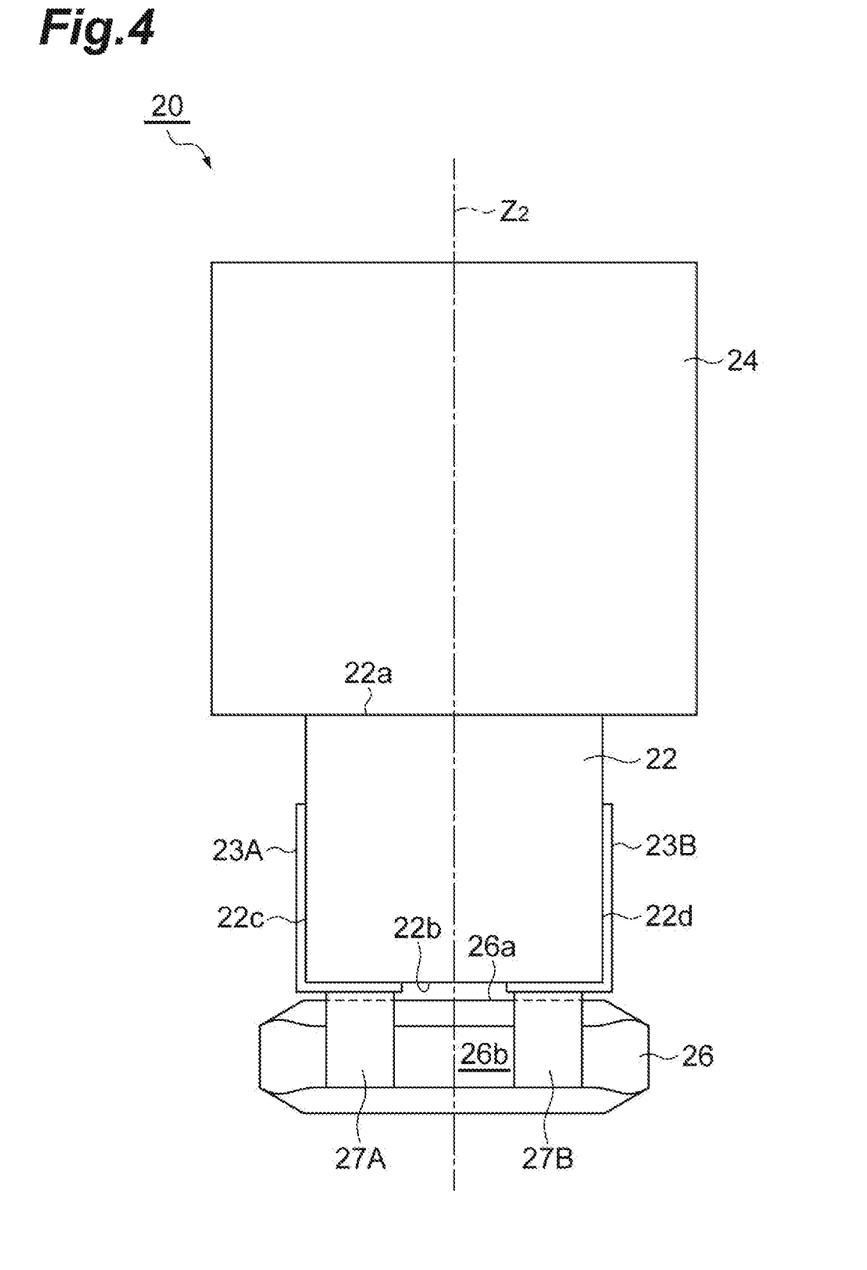
FIG. 4 is a side-elevational view illustrating the actuator illustrated in FIG. 3.

As illustrated in FIG. 4, the actuator 20 includes a piezoelectric element 22, a drive shaft 24, and a weight 26. The piezoelectric element 22 has a rectangular columnar shape. The drive shaft 24 is joined with a top surface 22a of the piezoelectric element 22. The weight 26 is joined with a bottom surface 22b of the piezoelectric element 22. The piezoelectric element 22 may be bonded with the drive shaft 24 and the weight 26 using an adhesive such as an epoxy adhesive.

The piezoelectric element 22 is formed of a piezoelectric material. Examples of the piezoelectric materials include, but are not limited to, inorganic piezoelectric materials such as lead zirconate titanate (what is called PZT), crystal, lithium niobate ($LiNbO_3$), potassium tantalate niobate (K(Ta, Nb) $O_3$), barium titanate ($BaTiO_3$), lithium tantalate ($LiTaO_3$), and strontium titanate ($SrTiO_3$). The piezoelectric element 22 may be configured into a laminated structure that alternately stacks a plurality of piezoelectric layers formed of a piezoelectric material and a plurality of electrode layers.

The piezoelectric element 22 includes a pair of electrodes 23A and 23B. The electrodes 23A and 23B extend, respectively, from lateral surfaces 22c and 22d that face each other to the bottom surface 22b. The electrodes 23A and 23B may be formed by, for example, sputtering of Ag. The piezoelectric element 22 is adjusted (polarization of piezoelectric ceramics) to extend or contract in a direction extending along an axis thereof (axis Z2 illustrated in FIG. 4) when voltage is applied to the piezoelectric element 22 by the pair of electrodes 23A and 23B. Thus, controlling the voltage applied across the electrodes 23A and 23B allows the extension and contraction of the piezoelectric element 22 to be controlled.

The rectangular columnar shape of the piezoelectric element 22 is illustrative only and not limiting. The piezoelectric element 22 may be formed into, for example, a cylindrical column. The piezoelectric element 22 is required only to be capable of extending and contracting in one direction.

The drive shaft 24 is formed of a composite resin material including a fiber such as a carbon fiber. The drive shaft 24 has a cylindrical columnar shape having a width wider than a width of the piezoelectric element 22. The drive shaft 24 is aligned with the axis Z2 of the piezoelectric element 22.

The weight 26 is formed of a material having a high specific gravity, such as tungsten and tungsten alloy. The weight 26 is thus designed to be heavier than the drive shaft 24. The weight 26, being designed to be heavier than the drive shaft 24, is less likely to be displaced and allows the drive shaft 24 to be efficiently displaced when the piezoelectric element 22 extends and contracts. The weight 26 has a rectangular flat sheet shape and is aligned with the axis Z2 of the piezoelectric element 22. The weight 26 includes a pair of electrodes 27A and 27B. The electrodes 27A and 27B extend from an end face 26a of the weight 26 on the side adjacent to the piezoelectric element 22 to one lateral surface 26b. Of the electrodes 27A and 27B, the electrode 27A is electrically connected with the electrode 23A disposed on the piezoelectric element 22 and the electrode 27B is electrically connected with the electrode 23B disposed on the piezoelectric element 22.

Reference is made back to FIG. 3. The actuator holding portion 14 of the base member 10 is designed to have a shape and dimensions such that the weight 26 of the actuator 20 can be generally housed therein. The actuator holding portion 14 is designed to have a depth deeper that a height of the weight 26 of the actuator 20 so as not to allow the weight 26 of the actuator 20 to be easily dislocated. The lens drive unit 1 is designed such that, when the actuator 20 is disposed in the actuator holding portion 14 in the base member 10, the axis Z2 of the actuator 20 extends in parallel with the lens optical axis Z1 of the lens drive unit 1.

The base member 10 includes a pair of terminal electrodes 16A and 16B that are withdrawn to an outside from one inner lateral surface 14a of the actuator holding portion 14. When the weight 26 of the actuator 20 is housed in the actuator holding portion 14, the terminal electrodes 16A and 16B are electrically connected to the electrodes 27A and 27B, respectively, of the weight 26. The pair of terminal electrodes 16A and 16B of the actuator holding portion 14 is withdrawn, via a cutout 18 in the base member 10, up to a pair of external terminal electrodes 17A and 17B that are connected with an external control circuit of the lens drive unit 1. Thus, a voltage signal applied across the external terminal electrodes 17A and 17B is applied across the electrodes 23A and 23B of the actuator 20 via the terminal electrodes 16A and 16B of the actuator holding portion 14, so that the actuator 20 extends and contracts.

The friction engagement unit 30 includes the lens frame 40 and the friction engagement member 50 that frictionally engages the actuator 20.

The lens frame 40 has a circular tubular shape oriented in the direction of the lens optical axis Z1. The lens frame 40 is disposed on the bottom 11 of the base member 10 so as to be surrounded by the first lateral wall 12a, the second lateral wall 12b, the third lateral wall 12c, and the fourth lateral wall 12d. The lens frame 40 has an opening 41 at a center thereof. The lens L can be mounted in the opening 41 so as to be oriented in the direction of the lens optical axis Z1. The lens L may be a lens unit including a plurality of lenses or may even be a single lens. The opening 41 of the lens frame 40 has a dimension substantially identical to a dimension of the opening 11e in the bottom 11.

The lens frame 40 has the first protrusion 42 formed on an outer peripheral surface thereof. The first protrusion 42 fits in the cutout 13 in the second lateral wall 12b of the base member 10. The first protrusion 42 has a shape and dimensions that are substantially identical to a shape and dimensions of the cutout 13. Specifically, the cutout 13 is slightly larger than the first protrusion 42, so that the first protrusion 42 can be fitted into the cutout 13. The fitting achieved between the first protrusion 42 of the lens frame 40 and the cutout 13 in the second lateral wall 12b prevents the lens frame 40 from rotating about the lens optical axis Z1.

Additionally, the lens frame 40 includes a fixing portion 43 provided on the outer peripheral surface thereof. The fixing portion 43 houses a trailing end 50b of the friction engagement member 50 to be described later to thereby position and fix in place the friction engagement member 50.

The lens frame 40 further has a second protrusion 44 formed on the outer peripheral surface thereof at a position close to the first lateral wall 12a of the base member 10. The friction engagement member 50 has a leading end 50a abutting on the second protrusion 44. The friction engagement member 50 is thereby be positioned by the second protrusion 44.

The friction engagement member 50 is a band-shaped metal part having elasticity. The friction engagement member 50 is disposed along the outer peripheral surface of the lens frame 40. The friction engagement member 50 has the leading end 50a that frictionally engages the actuator 20 and the trailing end 50b that assumes a fixing end to be fixed in the fixing portion 43 of the lens frame 40. At least the leading end 50a of the friction engagement member 50 is disposed so as to be orthogonal to the lens optical axis Z1 and the axis Z2 of the actuator 20. The friction engagement member 50 is obtained through blanking and bending of a single sheet of metal.

The friction engagement member 50 has the leading end 50a trifurcated. The trifurcated leading end 50a includes the I-shaped spring portion 52 extending from a central portion in a width direction of the friction engagement member 50 linearly in a direction in which the friction engagement member 50 extends and the U-shaped shaft receiver (slider portion) 54 extending from both ends in the width direction along the outer peripheral surface of the lens frame 40.

Leading ends 54a of the shaft receiver 54 are bent substantially at right angles along a substantially right-angled corner defined between the outer peripheral surface and the second protrusion 44 of the lens frame 40. The drive shaft 24 of the actuator 20 is clamped between a free end 52a of the spring portion 52 and the leading ends 54a of the shaft receiver 54 and is biased toward the shaft receiver 54 from the spring portion 52 by the elasticity of the spring portion 52. Thus, the friction engagement member 50 frictionally engages the drive shaft 24 of the actuator 20.

A positional relation of the drive shaft 24 of the actuator 20 will be described in detail below with reference to FIG. 5.

Figure 5:
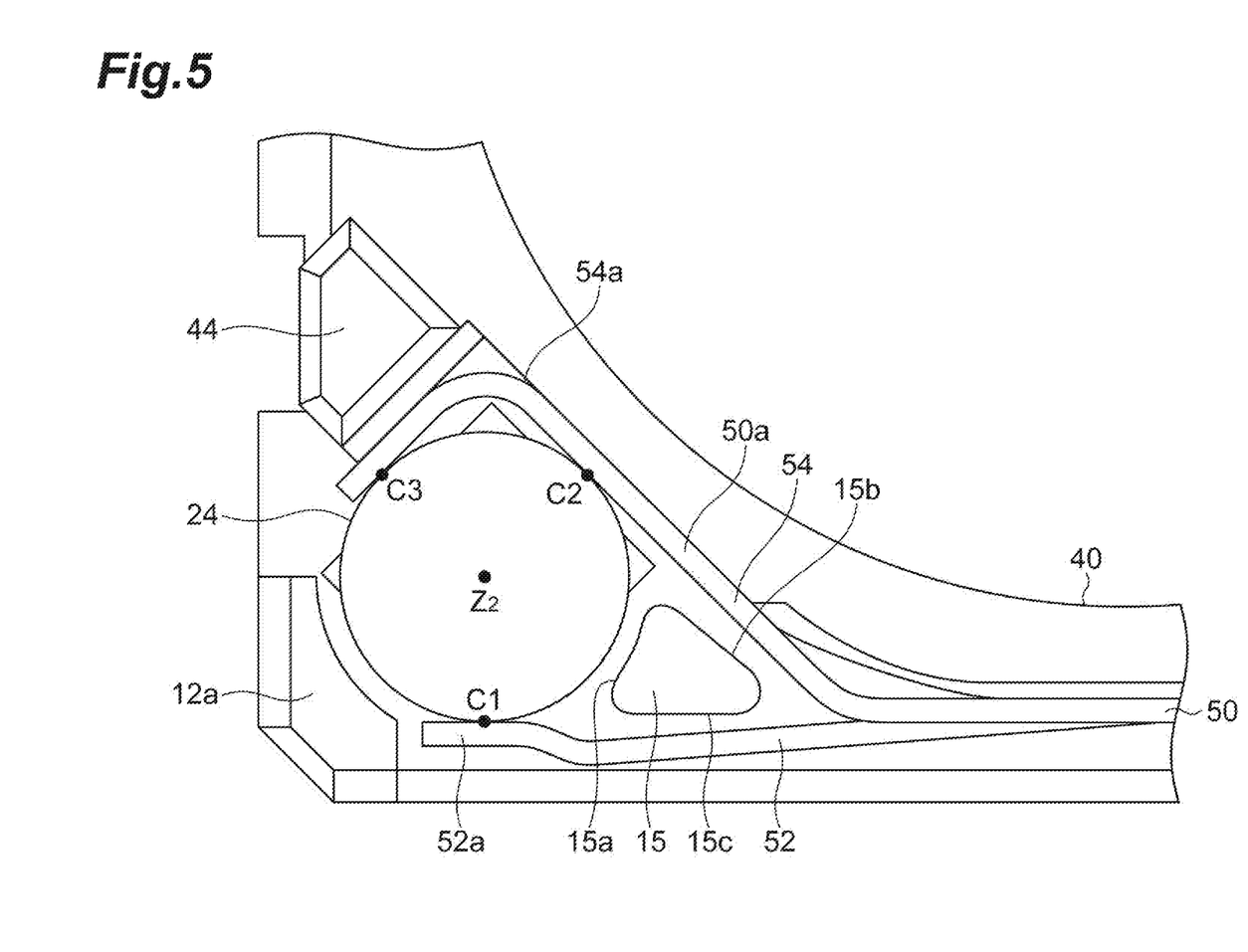
FIG. 5 is a plan view illustrating a positional relation of a drive shaft that is not displaced.

As illustrated in FIG. 5, the drive shaft 24 of the actuator 20 is held at a total of three positions of one contact position C1 with respect to the free end 52a of the spring portion 52, and two contact positions C2 and C3 across a bend of the shaft receiver 54. The clamping of the drive shaft 24 by the friction engagement member 50 at the three positions establishes a distinct position of the drive shaft 24 in a plan view (specifically, as viewed from the direction of the axis Z2 of the piezoelectric element 22).

The first lateral wall 12a of the base member 10 is disposed opposite to the contact position C2 across the axis Z2 of the actuator 20 in a plan view. The first lateral wall 12a is spaced a predetermined distance away from the drive shaft 24 of the actuator 20.

The column 15 of the base member 10 is disposed within a region defined, in a plan view, by the spring portion 52 and the shaft receiver 54 that represent a Y-shaped bifurcation of the friction engagement member 50 and the drive shaft 24 of the actuator 20, and at a position opposite to the contact position C3 across the axis Z2 of the actuator 20. The column 15 has a substantially triangular cross section tapering toward the bifurcation of the friction engagement member 50. The column 15 has three lateral surfaces 15a, 15b, and 15c that correspond, respectively, to the three sides of the triangular cross section. The lateral surface (first opposed surface) 15a is oriented toward the drive shaft 24 and faces an outer peripheral surface of the drive shaft 24. The lateral surface 15a has a shape that follows along a surface of the outer peripheral surface of the drive shaft 24. More specifically, the lateral surface 15a is curved inwardly so as to follow along a curve of the outer peripheral surface of the drive shaft 24. The lateral surfaces 15b and 15c (second opposed surfaces) are oriented toward the friction engagement member 50. The lateral surface 15b faces the shaft receiver 54 and the lateral surface 15c faces the spring portion 52. The lateral surfaces 15b and 15c each have a shape that follows along the friction engagement member 50. More specifically, the lateral surfaces 15b and 15c have flat shapes so as to follow along the shaft receiver 54 and the spring portion 52 of the friction engagement member 50, respectively. The lateral surfaces 15a, 15b, and 15c of the column 15 are spaced a predetermined distance away from the drive shaft 24 of the actuator 20, and the shaft receiver 54 and the spring portion 52 of the friction engagement member 50, respectively.

It is here noted that the lens frame 40 in which the lens L is mounted has a specific gravity higher than a specific gravity of the actuator 20. Thus, when the lens frame 40 is displaced, a pressing force involved with the displacement is applied to the actuator 20. More specifically, the pressing force is transmitted from the contact positions C2 and C3 between the friction engagement member 50 and the drive shaft 24 to the drive shaft 24. The displacement of the lens frame 40 can occur from, for example, impact from the outside of the lens drive unit 1.

Figure 6:
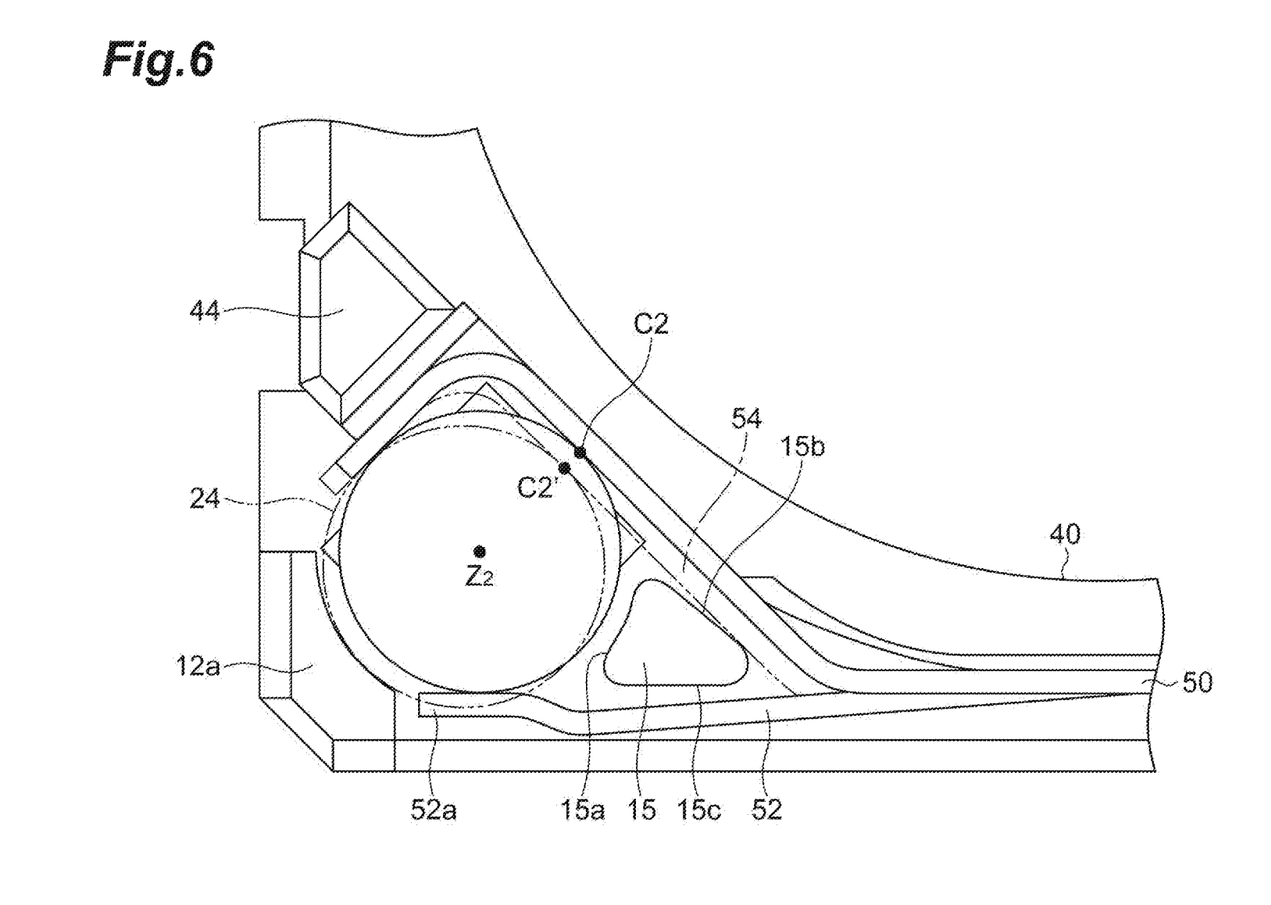
FIG. 6 is a plan view illustrating the drive shaft that has been displaced.

FIG. 6 illustrates a condition in which the lens frame 40 is displaced in a radial direction of the opening 41 and the drive shaft 24 is pressed at the contact position C2.

At this time, the contact position is displaced from C2 to C2' and the drive shaft 24 of the actuator 20 is displaced in the radial direction of the opening 41 in the lens frame 40. Because the weight 26 of the actuator 20 is fixed in the actuator holding portion 14 of the base member 10, the displacement of the drive shaft 24 relative to the base member 10 causes the actuator 20 to be inclined. It is here noted that the drive shaft 24 is displaced only until the drive shaft 24 contacts the first lateral wall 12a disposed in the direction of displacement of the drive shaft 24 (specifically, the drive shaft 24 is displaced only a distance equivalent to a spaced distance between the drive shaft 24 and the first lateral wall 12a). Further displacement of the drive shaft 24 is restricted upon contact of the drive shaft 24 with the first lateral wall 12a. Even when the drive shaft 24 is in contact with the first lateral wall 12a (specifically, upon maximum displacement), the shaft receiver 54 of the friction engagement member 50 remains spaced away from the second opposed surface 15b of the column 15, so that the shaft receiver 54 does not contact the second opposed surface 15b of the column 15. As such, the restriction of displacement of the drive shaft 24 restricts the actuator 20 from being inclined.

Figure 7:
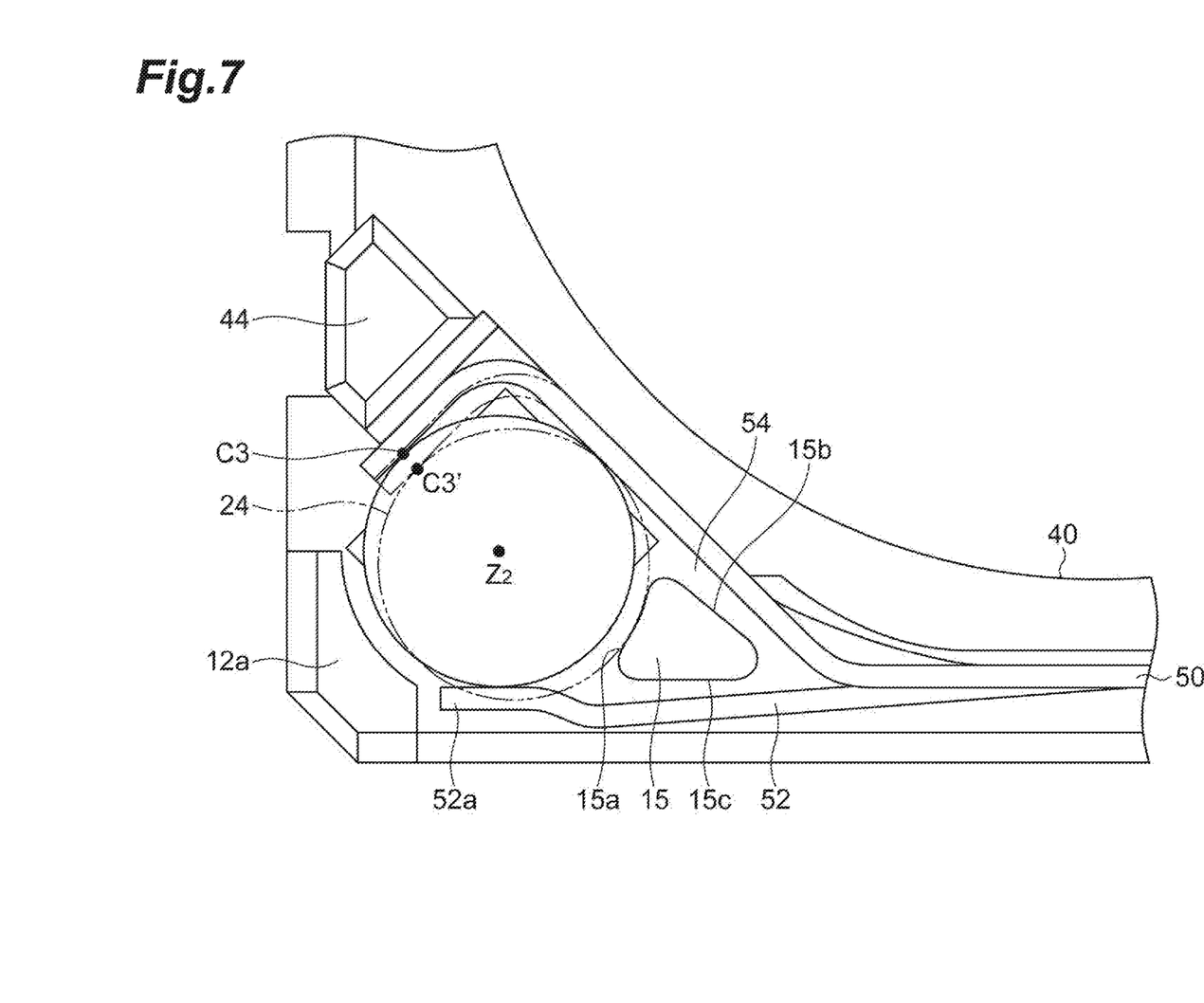
FIG. 7 is a plan view illustrating the drive shaft that has been displaced.

FIG. 7 illustrates a condition in which the lens frame 40 is displaced in a circumferential direction of the opening 41 and the drive shaft 24 is pressed at the contact position C3.

At this time, the contact position is displaced from C3 to C3' and the drive shaft 24 of the actuator 20 is displaced in the circumferential direction of the opening 41 in the lens frame 40. Because the weight 26 of the actuator 20 is fixed in the actuator holding portion 14 of the base member 10, the displacement of the drive shaft 24 relative to the base member 10 causes the actuator 20 to be inclined. It is here noted that the drive shaft 24 is displaced only until the drive shaft 24 contacts the first opposed surface 15a of the column 15 disposed in the direction of displacement of the drive shaft 24 (specifically, the drive shaft 24 is displaced only a distance equivalent to a spaced distance between the drive shaft 24 and the column 15). Further displacement of the drive shaft 24 and further inclination of the actuator 20 are restricted upon contact of the drive shaft 24 with the column 15.

As described above, the lens drive unit 1 includes: the actuator 20 that includes the piezoelectric element 22 and that is capable of extending and contracting in the axis Z2 direction; the base member 10 that fixes the actuator 20 at the weight 26 disposed on the first end in the direction in which the actuator 20 extends and contracts; the friction engagement member 50 having the leading end 50a on a first end of the friction engagement member 50 frictionally engaging the outer periphery of the drive shaft 24 disposed on the second end in the direction in which the actuator 20 extends and contracts, the leading end 50a extending in a direction orthogonal to the direction in which the actuator 20 extends and contracts; the lens frame 40 that is disposed at the trailing end 50b as a second end of the friction engagement member 50 and in which the lens L is to be mounted so as to have the lens optical axis Z1 oriented in a direction extending in parallel with the direction in which the actuator 20 extends and contracts; and the first lateral wall 12a (second inclination restrictor) and the column 15 (first inclination restrictor) disposed at positions opposite to the contact position C2 (second contact position) and the contact position C3 (first contact position), respectively, between the drive shaft 24 of the actuator 20 and the leading end 50a of the friction engagement member 50 across the axis Z2 of the actuator 20, having predetermined intervals from the drive shaft 24 of the actuator 20 as viewed from the direction in which the actuator 20 extends and contracts.

In the lens drive unit 1, when a difference in speed is produced between when the actuator 20 extends and when the actuator 20 contracts during the extension and contraction of the actuator 20, the friction engagement member 50 that is frictionally engaged with the outer periphery of the drive shaft 24 of the actuator 20 is driven in the direction in which the actuator 20 extends and contracts. As the friction engagement member 50 is driven, the lens frame 40 disposed at the trailing end 50b of the friction engagement member 50 is also driven in the direction in which the actuator 20 extends and contracts (Z2 direction). The lens frame 40, because being disposed such that the lens L is to be mounted therein so as to have the lens optical axis Z1 oriented in a direction extending in parallel with the direction in which the actuator 20 extends and contracts, can drive the lens L in the direction of the lens optical axis Z1.

When the lens frame 40 is displaced in a direction orthogonal to the direction in which the actuator 20 extends and contracts with respect to the base member 10 by, for example, impact from an outside of the lens drive unit 1, the drive shaft 24 of the actuator 20 abuts on the first lateral wall 12a and the column 15, so that the actuator 20 is prevented from being inclined with respect to the base member 10.

When the actuator 20 is inclined excessively with respect to the base member 10, the weight 26 of the actuator 20 may be dislocated from the actuator holding portion 14, an image quality may be degraded as a result of the lens optical axis Z1 of the lens L being inclined with respect to an image sensor disposed to face the lens drive unit 1, or any other faulty condition may develop.

The first lateral wall 12a and the column 15 as the inclination restrictors may be integrally molded with the base member 10 or separately disposed in the base member 10.

The lens drive unit 1 may include only either one of the first lateral wall 12a and the column 15 as the inclination restrictor. If a plurality of inclination restrictors are included, the drive shaft 24 can be prevented from being displaced in a plurality of directions, so that the actuator 20 can be prevented from being inclined even more effectively.

What is claimed is:

1. A lens drive unit comprising:
    an actuator, including a piezoelectric element, configured to be capable of extending and contracting in one direction;
    a base member configured to fix the actuator on one end in a direction of extension and contraction of the actuator;
    a friction engagement member having one end frictionally engaging an outer periphery of the other end of the actuator in the direction of extension and contraction of the actuator;
    a lens frame coupled to the friction engagement member; and
    an inclination restrictor disposed at a position opposite to a contact position between the other end of the actuator and the one end of the friction engagement member with respect to an axis of the actuator, having predetermined intervals from the other end of the actuator as viewed from the direction of extension and contraction of the actuator,
    wherein the other end of the actuator contacts the friction engagement member at a first contact position and a second contact position, and
    wherein the inclination restrictor includes a first inclination restrictor disposed at a position opposite to the first contact position with respect to the axis of the actuator and a second inclination restrictor disposed at a position opposite to the second contact position with respect to the axis of the actuator.

2. The lens drive unit according to claim 1, wherein the friction engagement member includes, on a side of one end of the friction engagement member, a slider portion held by the lens frame and a spring portion biased toward the slider portion, and the slider portion and the spring portion clamp therebetween the other end of the actuator to frictionally engage the other end of the actuator.

3. The lens drive unit according to claim 2, wherein the first inclination restrictor is disposed in a region surrounded by the slider portion of the friction engagement member, the spring portion of the friction engagement member, and the actuator.

4. The lens drive unit according to claim 3, wherein the first inclination restrictor has a first opposed surface facing an outer peripheral surface of the other end of the actuator, the first opposed surface having a shape that follows along the outer peripheral surface.

5. The lens drive unit according to claim 3, wherein the first inclination restrictor has a second opposed surface facing the friction engagement member, the second opposed surface having a shape that follows along a shape of the friction engagement member.

6. The lens drive unit according to claim 3, wherein the first inclination restrictor is spaced a predetermined distance away from the friction engagement member.

7. The lens drive unit according to claim 1, wherein the first inclination restrictor and the second inclination restrictor are formed of a material identical to a material forming the base member.

8. The lens drive unit according to claim 7, wherein the first inclination restrictor and the second inclination restrictor are integrally molded with the base member.

9. The lens drive unit according to claim 1, wherein the friction engagement member has the one end extending in a direction orthogonal to the direction of extension and contraction of the actuator and frictionally engaging an outer periphery of the other end of the actuator, and the friction engagement member has the other end coupled to the lens frame such that a lens is to be mounted so as to have a lens optical axis oriented in a direction extending in parallel with the direction of extension and contraction of the actuator.

* * * * *